Figure 1:
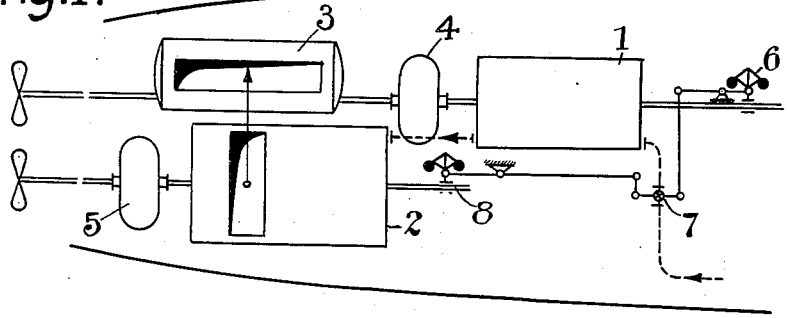

H. FÖTTINGER.
REGULATOR FOR POWER PLANTS.
APPLICATION FILED FEB. 24, 1914.

1,199,362.

Patented Sept. 26, 1916.
2 SHEETS—SHEET 1.

WITNESSES
Leonora R. Nicholsburg
E. Cottran

INVENTOR
Hermann Föttinger
BY C. W. Fairbank
ATTORNEY

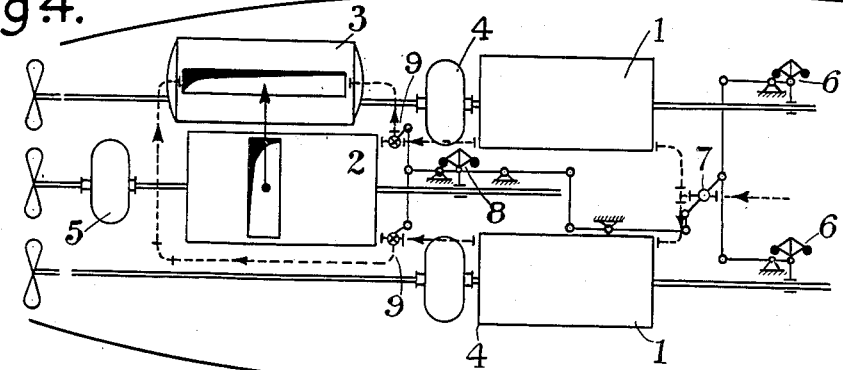
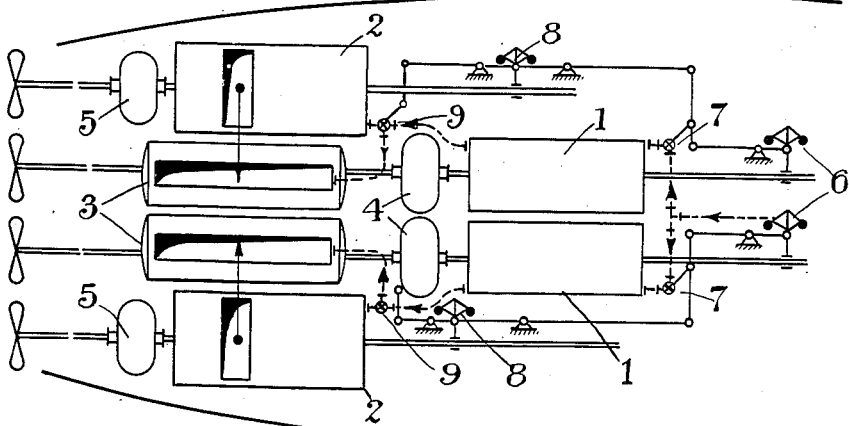
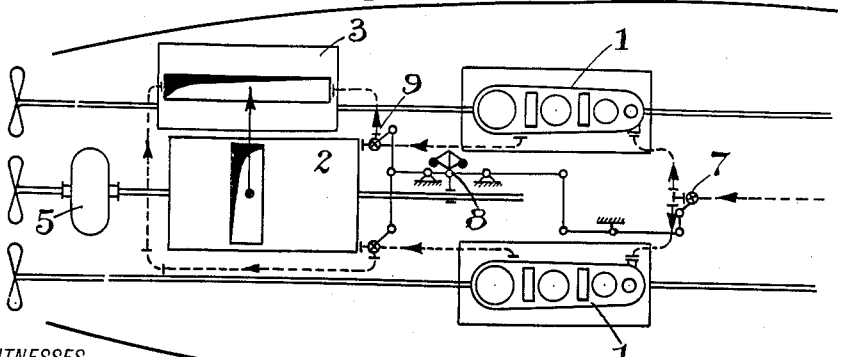

UNITED STATES PATENT OFFICE.

HERMANN FÖTTINGER, OF ZOPPOT, NEAR DANZIG, GERMANY.

REGULATOR FOR POWER PLANTS.

1,199,362.      Specification of Letters Patent.     Patented Sept. 26, 1916.

Application filed February 24, 1914. Serial No. 820,782.

*To all whom it may concern:*

Be it known that I, HERMANN FÖTTINGER, a subject of the German Emperor, and resident of Zoppot, near Danzig, in the Empire of Germany, have invented certain new and useful Improvements in Regulators for Power Plants, of which the following is a specification.

My invention relates to that type of power plants in which two or more prime movers are operated by the same motive fluid flowing through them in series and at decreasing pressures. A typical example of such a plant is the power plant of a ship in which a high pressure, high speed turbine drives one propeller shaft and a low pressure, lower speed turbine drives a second and independent propeller shaft. The medium pressure steam exhausted from the high pressure turbine serves to operate the low pressure turbine and the driving from both turbines to their respective propellers being through speed reduction or reversing gearing, preferably of the Föttinger type in which liquid inclosed in a tight casing transmits power from a driving member to a driven member, both inclosed in the casing. Such a Föttinger transmitter absorbs elastically any tendency toward rapid speed variations due to sudden and minor fluctuations in the load and thus prevents a transmission of the rapidly varying reactions back to the turbine. In ship turbine plants having such fluid power transmitters for the purpose of securing a reduction in the number or direction of revolutions of the propellers, it may happen that, by reason of some accident, the operating fluid of the power transmitter suddenly escapes from its casing. The resistance or load being instantly relieved, the driving turbine will dangerously increase its speed. If the latter is provided with a governor for regulating the speed of revolutions, an increase beyond a predetermined number of revolutions per minute of this turbine is made impossible. If however, the plant includes several turbines mounted on different shafts and successively receiving the same motive fluid, a mere throttling by shutting the steam supply valve of the turbine with light load or no load, suffices no longer, as it does not regulate the number of revolutions of the other turbine. The high pressure turbine will continue to receive the high pressure steam and an accumulation of this steam with the resulting increase in pressure, will endanger the turbine casing. In case there are employed a high pressure, a medium pressure, and a low pressure turbine, with steam pressures in the medium pressure turbine, that normally do not greatly exceed that of the atmosphere, the casing of the latter is not capable of withstanding the sudden admission of the steam at the high pressure employed at the inlet to the high pressure turbine.

By means of the present invention, in the case of a sudden change in the resistance of the fluid gearing or a sudden change in the load, I am able to keep the number of revolutions of the corresponding turbine within the predetermined limits, and also prevent the endangering of the other turbine casings and the accumulating of steam pressure by simultaneously controlling the steam supply or discharge valve of these other turbines.

My invention is not limited to any specific form of steam controlling mechanism and it may be applied in different kinds of power plants.

In the accompanying drawing to which reference is to be had, I have illustrated diagrammatically several different ways in which my invention may be applied in ship turbine plants.

In these drawings similar reference characters indicate corresponding parts in the views, and Figures 1 to 6 inclusive, show diagrammatic plan views of six different plants for ships and embodying my invention.

In Fig. 1, I have shown a power plant for ships in which there are two propeller shafts, one driven by a high pressure turbine 1, and the other by a low pressure turbine 2. Between the two turbines and their respective propellers are hydraulic power transmitters 4 and 5, preferably of the Föttinger type, and so designed as to transmit power by the movement of a liquid and to give the desired speed reduction ratio or reversal of direction of rotation. The steam to drive the turbines is delivered through a conduit to the high pressure turbine 1, and the exhaust of medium pressure steam is delivered from the latter through a conduit to the low pressure turbine 2. From the latter the exhaust steam flows through a conduit to the condenser 3.

In case of accident or if for any other reason the liquid within the power transmitter 5 should escape as for instance by a breaking of the casing, the entire load on the low pressure turbine 2 would be relieved and in the ordinary construction a governor or other speed controlling device would partially close the steam inlet to the low pressure turbine, so as to prevent the latter from exceeding a predetermined speed under such light load. This as above pointed out would result in an excessive pressure in the high pressure turbine 1, which might prove dangerous. By means of my invention I control the steam supply valve which delivers to the high pressure turbine, in accordance with the speed of rotation of the low pressure turbine. Any suitable means may be provided for this purpose as for instance a ball governor 8 with pivoted lever and link connections to the valve 7. This will control not only the high pressure turbine but will also control the low pressure turbine as the latter is operated by the exhaust from the former.

In case any accident should happen to the hydraulic power transmitter 4 of the high pressure turbine shaft, so as to relieve the load on the high pressure turbine, mechanism may also be provided for closing or partially closing the valve 7. Such mechanism is illustrated as a ball governor 6 on the high pressure shaft and connected to the valve 7 by suitable lever and link connections. As the two ball governors of the independently rotating shafts are connected to the same valve 7, it is evident that a relieving of the load of either turbine will operate to control both.

Figure 2:
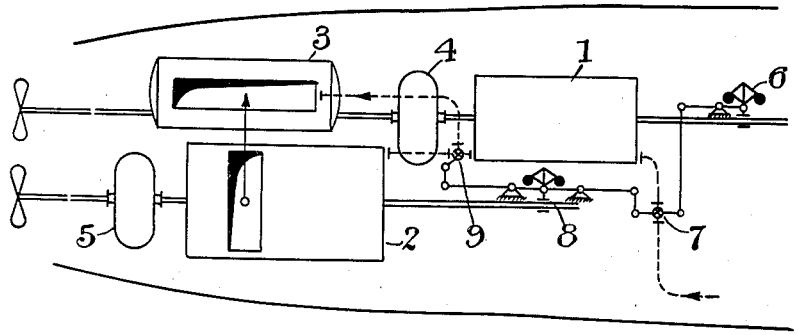

In Fig. 2 I have illustrated the same turbine power plant as in Fig. 1, but have illustrated a slightly modified arrangement of controlling mechanism. In this form I have provided a three-way valve 9 in the conduit connecting the high pressure turbine with the low pressure turbine and from this three-way valve have provided a conduit leading directly to the condenser 3. The same ball governor 8 which closes the inlet 7 to the high pressure turbine upon an increase in speed of the low pressure turbine serves also to turn the three-way valve 9, so that the exhaust from the high pressure turbine will be sent directly to the condenser, instead of to the low pressure turbine. The leverage of the connections between the governor 8 and the valve 9 may be so designed that upon only a partial decrease in the resistance in the power transmitter 5, or other decrease in the load on the low pressure turbine, the valve 9 may operate to deliver a part of the steam from the high pressure turbine directly to the condenser and a part to the low pressure turbine. It will be noted that the regulator or governor 8 not only controls the steam supply valve 7 of the turbine 1, but by passes the exhaust from the turbine 1 to the condenser so that the steam contained in the turbine 1 after the sudden closing of the valve 7, will not be delivered to the turbine 2. Thus the latter may be more quickly and effectively prevented from unduly increasing its speed upon a sudden decrease in load. In case of any failure of the power transmitter 4 or other relieving of the load on the high pressure turbine the governor 6 will not only control the inlet to the high pressure turbine, but through the links and levers will also control the valve 9 at the outlet from the high pressure turbine. I might under some circumstances arrange means whereby the failure of the power transmitter 4 would not only close the valve 7 and shift the valve 9 to connect the high pressure turbine with the condenser, but would also open a separate valve to deliver a separate supply of steam under the proper pressure to the low pressure turbine.

In ship turbine plants where three separate turbines, namely a high pressure, a medium pressure, and a low pressure turbine, are employed on separate shafts, my invention may be applied in such a way as to deliver the discharge steam of the high pressure turbine directly to the low pressure turbine without passing through the medium pressure turbine in case of a failure of the power transmitter of the latter, or any other sudden reduction of load. Such a valve reversing mechanism would ordinarily be operated by the regulator of the medium pressure turbine.

Figure 3:
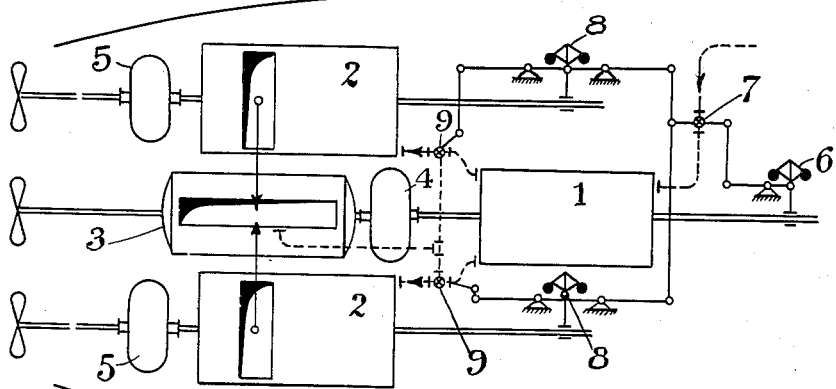

In Fig. 3 I have shown a turbine plant for ships very similar to that shown in Fig. 2 except that there are provided three shafts, the third one being operated by a second low pressure turbine. The regulating mechanism here employed may be substantially identical with that employed in Fig. 2, except that as the high pressure turbine would deliver to both low pressure turbines there would be provided two valves 9, and as there would be two governors 8, both connected to the same valve 7, the governors might or might not mutually act to control each other.

In Fig. 4 I have shown a plant somewhat similar to that shown in Fig. 3, except that there are provided two high pressure turbines and one low pressure turbine instead of one at high pressure and two at low pressures. Here both high pressure turbines would deliver the exhaust to the same low pressure turbine and the governors 6—6 of the two high pressure turbines would act to operate the same valve 7, which latter would control the supply of steam to both high pressure turbines. As the low pressure turbine might have two inlets there would be provided two valves 9—9 controlled by the same governor 8.

In Fig. 5 I have shown a four shaft plant which involves substantially a combining of two separate plants both of the character shown in Fig. 2. As each half operates the same as the construction shown in Fig. 2, detail description is thought to be unnecessary.

In Fig. 6 I have shown a three-shaft power plant in which the high pressure steam is in two piston steam engines 1ª—1ª, operating two of the shafts while the third shaft is operated by a turbine receiving the exhaust from both of the high pressure engines. The operation is substantially the same as in the plant shown in Fig. 4, except that where reciprocating engines are employed, speed reducing power transmitters need not be employed. In this figure I have not shown any power transmitters for the shafts of the reciprocating engines and have not illustrated any governor operated by these engines for controlling the high pressure inlet valve 7. The governor 8 of the low pressure turbine shaft serves not only to control the inlet to the piston engines, but also to control the delivery of steam from the piston engines to either the low pressure turbine or to the condenser. In this combination of reciprocating engines and turbine the danger of bursting the casing of the high pressure prime mover is quite largely eliminated.

It will be noted that in all of the forms above described, I make it possible to secure the safe and reliable operation under any circumstances, by means of simple connections between the various governors or turbine regulators. Thus in the event of a sudden accident at sea which might cause a cracking or breaking of the casing of the hydraulic gearing or the sudden reduction of load on the turbines from any other cause, the turbines are prevented from racing or being injured by excessive speed or steam pressure. It is only necessary for the engineer to actuate his main steam supply and maneuvering valves when he desires to manually control the turbines, all other controlling even in case of accident being done automatically by my improved construction. Even in case of a series of accidents involving all the power transmitters or affecting all of the turbines and which would rarely if ever occur, the entire plant would be properly controlled.

Having thus described my invention, what I claim as new and desire to protect by Letters Patent, is:

1. The combination with a power plant including a plurality of units operating independently on successive expansions of a motive fluid, of means automatically permitting the direct exhausting of motive fluid from the high pressure unit upon relieving the low pressure unit of load.

2. The combination with a power plant including a plurality of separate and independent units each capable of operating at its own speed and all operated by the same motive fluid but in succession at successive reductions in pressure, separate hydraulic power transmitters receiving the power from each unit and a condenser receiving the motive fluid from the last unit, of separate speed regulators for said units and operating connections between said regulators.

3. The combination with a power plant including a plurality of separate and independent units each capable of operating at its own speed and all operated by the same motive fluid but in succession at successive reductions in pressure, separate hydraulic power transmitters receiving the power from each unit and a condenser receiving the motive fluid from the last unit, of means for closing the motive fluid supply inlet of the low pressure unit upon a decrease of resistance in the power transmitter of said low pressure unit.

4. The combination with a power plant including a plurality of separate and independent units each capable of operating at its own speed and all operated by the same motive fluid but in succession at successive reductions in pressure, separate hydraulic power transmitters receiving the power from each unit and a condenser receiving the motive fluid from the last unit, of means for diverting the motive fluid directly from the exhaust of the high pressure unit to the condenser instead of passing it through the low pressure unit upon a decrease in the resistance at the power transmitter of the low pressure unit.

5. The combination with a power plant including a plurality of separate and independent units each capable of operating at its own speed and all operated by the same motive fluid but in succession at successive reductions in pressure, separate hydraulic power transmitters receiving the power from each unit and a condenser receiving the motive fluid from the last unit, of means for diverting the motive fluid directly from the exhaust of the high pressure unit to the condenser instead of passing it through the low pressure unit upon a decrease in the resistance at the power transmitter of either unit.

6. The combination with a power plant including a high pressure turbine and a low pressure turbine operating independently and by the same motive fluid with successive reductions in pressure of the latter and a condenser, of regulating means for closing the inlet to the high pressure turbine and by-passing the motive fluid from the exhaust of the high pressure turbine direct to the condenser upon a sudden decrease in the load of the low pressure turbine.

7. The combination with a power plant, including a plurality of units operating independently on successive expansions of a motive fluid, of means automatically permitting the direct exhausting of motive fluid from the high pressure unit upon relieving the low pressure unit of load, and means for simultaneously controlling the supply to the high pressure unit.

8. The combination with a power plant including a plurality of units operating independently on successive expansions of a motive fluid, a valve for controlling the admission of motive fluid to the high pressure unit, a valve for controlling the passage of motive fluid from the high pressure unit to a low pressure unit, and a governor operated by the low pressure unit for operating both of said valves.

9. The combination with a power plant, including a plurality of units operating independently on successive expansions of a motive fluid, a valve for controlling the admission of motive fluid to the high pressure unit, a valve for controlling the passage of motive fluid from the high pressure unit to the low pressure unit, and a governor operated by the high pressure unit for operating both of said valves.

10. The combination with a power plant, including a high pressure turbine, a low pressure turbine, an inlet valve for controlling the delivery of steam to the high pressure turbine, an inlet valve for controlling the delivery of steam to the low pressure turbine, a separate centrifugal governor for each turbine, and operating in accordance with the speed thereof, and connections between each of said governors and both of said valves.

11. In combination, a high pressure turbine, two separate low pressure turbines each receiving steam from the high pressure turbine, and means for automatically permitting direct exhausting of the motive fluid from said high pressure turbine upon relieving either low pressure turbine of load.

Signed at Danzig, West Prussia, Germany, this 12th day of February, A. D. 1914.

Dr. FÖTTINGER.

Witnesses:
ERNST SPRUNERK,
MARTA FRIESE.